Oct. 31, 1961   C. DE PREZ   3,006,974
PROCESS OF HALOGENATION
Filed Dec. 30, 1958
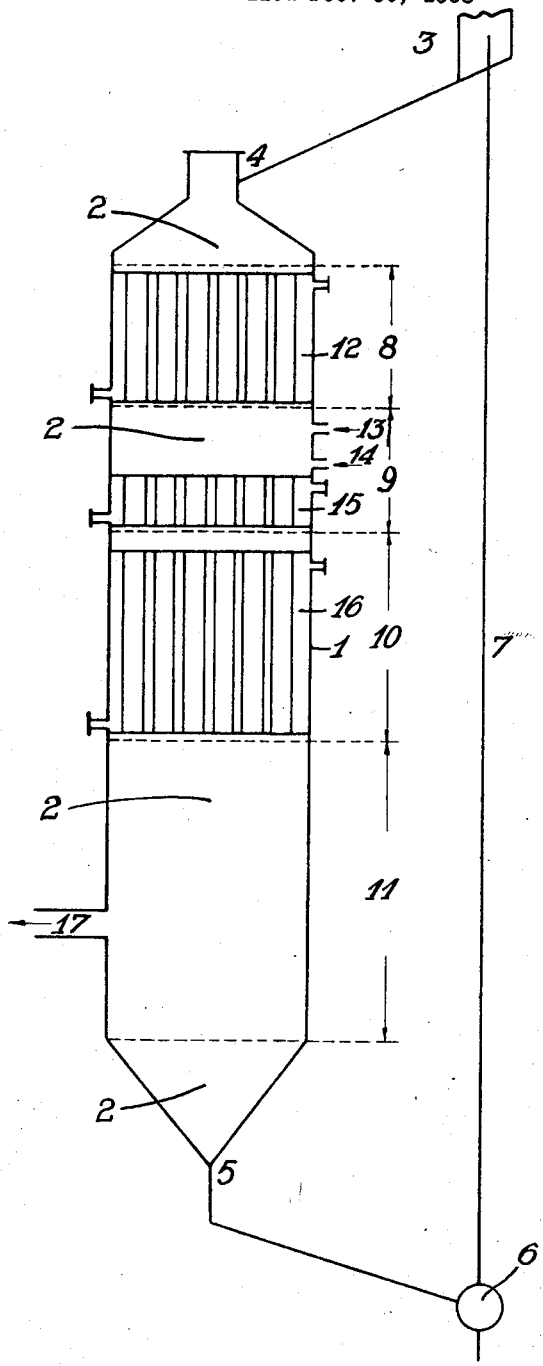

United States Patent Office 3,006,974
Patented Oct. 31, 1961

3,006,974
PROCESS OF HALOGENATION
Charles De Prez, Uccle-Brussels, Belgium, assignor to Solvay & Cie, Brussels, Belgium, a Belgian company
Filed Dec. 30, 1958, Ser. No. 783,973
Claims priority, application Belgium Jan. 8, 1958
6 Claims. (Cl. 260—656)

The present invention concerns a process for the halogenation of hydrocarbons in the gaseous phase, particularly a process for the chlorination of olefinic hydrocarbons by means of gaseous chlorine, in the presence of an adsorbing material and, if desired, of catalysts.

Another object of the invention is a process for the manufacture of monochlorethylene by pyrolysis of 1,2-dichlorethane obtained by chlorinating ethylene by means of gaseous chlorine in the presence of an adsorbing material and, if desired, of catalysts, without it being necessary to separate the dichlorethane prior to subjecting it to pyrolysis in a separate device.

Another object of the invention is a process for the manufacture of 3-chloropropene (allyl chloride) by pyrolysis of dichloropropane obtained by chlorinating propylene by means of gaseous chlorine in the presence of an adsorbing material and, if desired, of catalysts, without it being necessary to separate the dichloropropane prior to subjecting it to pyrolysis in a separate device.

The applicant has found that by introducing gaseous chlorine and ethylene or propylane in a molar ratio essentially equal to 1:1, the chlorination reaction proceeds immediately if the gaseous reagents are introduced into a moving bed of adsorbing material, if desired in the presence of catalysts. The applicant has also found that the pyrolysis of the dichlorethane or dichloropropane obtained by chorination of ethylene or propylene respectively can be effected in the same moving bed and that vinyl chloride or allyls chloride are thus recovered in excellent yields.

The advantages of such a process are clearly evident. On account of the heat released by the adsorption of chlorine on the material of the moving bed and of the heat released by the chlorination reaction of the olefins, it is not necessary to provide for special means of heating for maintaining the temperature of pyrolysis of the saturated chlorinated hydrocarbons, since the heat released is carried away by the moving bed to the point of its utilisation. Moreover, the temperature is regularly distributed all over the cross-section of the reaction zone, that is to say that there is no gradient of temperature, as is the case with the hitherto used processes where the reaction zones are heated or cooled externally. In the process of the invention, the whole of the heat is transmitted through the interior of the reactor, and for this reason the materials required for the construction of the reactors are ordinary inexpensive materials, contradistinction to the materials used for the hitherto known processes. Another advantage of the process is the simple construction of the reactor, whilst up to the present, reactors of a complicated shape have been proposed, in order to obviate points of excessive temperature in the reaction zone.

As adsorbing material, active carbon is preferably selected; but wood charcoal, animal charcoal, gels of silica or of alumina may also be used. As catalysts, there are chosen the catalysts known to promote chlorination and dehydrochlorination, for example metal chlorides such as the chlorides of barium, cobalt, nickel, zinc, manganese, iron, copper etc.

The invention is explained in detail with reference to the single figure of the accompanying drawing. It must be understood that this figure is given only for the purpose of an illustration and that it does in no way limit the scope of the invention which is capable of numerous variations without leaving its spirit.

The single figure of the accompanying drawing very schematically shows a device for carrying out the process of the invention.

In the reactor 1, a bed 2 of the adsorbing material, for example active carbon circulates from the top to the bottom. The latter descends from a storage reservoir 3, passes into the reactor 1 at 4 and leaves it at 5 from where it is reconducted into the storage reservoir 3 by the blower 6 and the pipe 7.

In order to facilitate the explanation, the following zones of the reactor will be considered taken from the top to the bottom: a zone of cooling 8, a zone of adsorption of chlorine and of chlorination 9, a zone of pyrolysis 10 and a zone 11 from which the final products are evacuated and where the adsorbing material is again in the same chemical state as in the zone 8. It is evident that a small quantity of chlorinated products may remain adsorbed on the adsorbing material and can only be desorbed at a more elevated temperature. Some of these chlorinated products, chiefly dichlorethane or dichloropropane, can be recycled; it is sufficient to introduce, at the start of the operation, a very small excess of chlorine corresponding to the formation of these products and thereafter the work is carried out with quantities of chlorine and olefin substantially in the molar ratio corresponding to the chlorinated products separated from the cycle of production.

The zone 8 is fitted with a cooling system 12 the object of which is to bring the adsorbing material to a temperature promoting the adsorption of chlorine. The zone 9 carries the inlet tube for chlorine 13 and the inlet tube for olefin 14. In this zone, there is provided the device for regulating the temperature 15 which is intended to supply heat at the beginning of the operation, if necessary. The zone of pyrolysis 10 is fitted with a device for regulating the temperature 16 which is intended either for supplying the heat required for pyrolysis or for supplying the cooling agent. The device is automatically controlled as a function of the temperature to be maintained in this zone, said temperature depending on the desired products.

The zone 11 is fitted with a tube 17 for evacuating the products obtained which are then condensed and rectified.

The chlorine is introduced at 13, very rapidly adsorbed on the particles of the adsorbing material and it descends towards the lower zones. The ethylene is introduced at 14 and chlorination of this olefin sets in immediately. On account of the heat released by the adsorption of chlorine on the adsorbing material and by the chlorination reaction, the pyrolysis of the 1,2-dichlorethane starts almost immediately. It has been observed that by maintaining the temperature in the zone 11 at about 350–450° C., the temperature being maintained by the cooling system 16, excellent yields in monochlorethylene are obtained which is evacuated at 17. The gases obtained are recovered, condensed and the hydrogen chloride formed is separated which may then be returned into a column where a bed of adsorbing material circulates and where acetylene is introduced, in order to form new quantities of monochlorethylene. A portion of hydrogen chloride may be used as a vehicle for carrying up the adsorbing material towards the top of the reactor.

The unreacted dichlorethane may be recycled, if desired, in order to be converted into monochlorethylene. This chlorinated hydrocarbon is obtained in a very pure state and in a yield of the order of 92 to 95%, referred to the chlorine introduced into the reactor.

The process is carried out in the same manner with propylene, but in this case the temperature in the zone of pyrolysis is maintained between 400 and 500° C.

If desired, the reagents may be heated by passing them through a heat exchanger, the heat source of which is constituted by the moving bed which is to be cooled after the zone of pyrolysis. Allyl chloride is then obtained in a high yield. Unreacted dichloropropane may be recycled, if desired.

The advantages of the process are clearly evident: it requires a simple little bulky apparatus. Since there is no gradient of temperature over the cross-section of the reactor and since the major portion of heat is generated by the chlorination of the olefin and, moreover, since the whole of the heat is transmitted through the interior of the reactor, the materials for constructing the said reactor need not be selected from special uneconomic materials, as problems of corrosion do not arise.

I claim:

1. A process for the preparation by addition chlorination of chlorinated olefinic hydrocarbons selected from the group consisting of monochlorethylene and 3-chloropropene, which comprises providing a movable bed of an adsorbent which has been impregnated with a catalyst favorably affecting the rate of reaction between chlorine and an olefin selected from the group consisting of ethylene and propylene, said movable bed comprising from the top to the bottom, a cooling zone for the adsorbent, an adsorption and reaction zone, a pyrolysis zone maintained at a temperature between 350 and 500° C., and a separation zone for separating the formed products from the moving bed, feeding gaseous chlorine at the top of the adsorption and reaction zone, feeding said olefin into the middle of the adsorption and reaction zone, wherein the two gases are interacted in a molecular ratio of substantially 1:1 to produce a saturated chlorinated hydrocarbon selected from the group consisting of 1,2-dichloroethane and dichloropropane, submitting said saturated chlorinated hydrocarbon to pyrolysis in the pyrolysis zone, separating the produced mixture of chlorinated compounds and hydrogen chloride from the movable bed in the separation zone, rectifying said mixture of chlorinated products to separate said product selected from the group consisting of monochloroethylene and 3-chloropropene in a pure state from the remainder of said mixture, recycling into the pyrolysis zone the remainder of said mixture for cracking the same into chlorinated olefinic hydrocarbons selected from the group consisting of monochloroethylene and 3-chloropropene, and recycling the adsorbent into the cooling zone by means of an ascending stream of hydrogen chloride.

2. A process for the preparation by addition chlorination of chlorinated olefinic hydrocarbons selected from the group consisting of monochloroethylene and 3-chloropropene, which comprises providing a movable bed of an adsorbent selected from the group consisting of active carbon, wood charcoal, animal charcoal, silica gel and alumina gel, impregnated with a metal chloride catalyst, said movable bed comprising from the top to the bottom, a cooling zone for the adsorbent, an adsorption and reaction zone, a pyrolysis zone maintained at a temperature between 350 and 500° C., and a separation zone for separating the formed products from the moving bed, feeding gaseous chlorine at the top of the adsorption and reaction zone, feeding said olefin into the middle of the adsorption and reaction zone, wherein the two gases are interacted in a molecular ratio of substantially 1:1 to produce a saturated chlorinated hydrocarbon selected from the group consisting of 1,2-dichloroethane and dichloropropane, submitting said saturated chlorinated hydrocarbon to pyrolysis in the pyrolysis zone, separating the produced mixture of chlorinated compounds and hydrogen chloride from the movable bed in the separation zone, rectifying said mixture of chlorinated products to separate said product selected from the group consisting of monochloroethylene and 3-chloropropene in a pure state from the remainder of said mixture, recycling into the pyrolysis zone the remainder of said mixture for cracking the same into chlorinated olefinic hydrocarbons selected from the group consisting of monochloroethylene and 3-chloropropene, and recycling the adsorbent into the cooling zone by means of an ascending stream of hydrogen chloride.

3. Process for the preparation by addition chlorination of monochloroethylene which comprises providing a movable bed of an adsorbent impregnated with a catalyst favorably affecting the rate of reaction between chlorine and ethylene, said movable bed comprising from the top to the bottom, a cooling zone for the adsorbent, an adsorption and reaction zone, a pyrolysis zone maintained at a temperature between 350 and 450° C. and a separation zone for separating the formed products from the moving bed, feeding gaseous chlorine at the top of the adsorption and reaction zone, feeding ethylene into the middle of the adsorption and reaction zone, wherein the two gases are interacted in a molecular ratio of substantially 1:1, submitting the 1,2-dichloroethane produced to pyrolysis in the pyrolysis zone, separating the produced organic chlorinated compounds and hydrogen chloride from the movable bed in the separation zone, rectifying the organic chlorinated products to separate monochloroethylene in a pure state from the remainder of said products, recycling the remainder of said products into the pyrolysis zone for cracking the same into monochloroethylene, and recycling the adsorbent into said cooling zone by means of an ascending stream of hydrogen chloride.

4. A process for the preparation by addition chlorination of monochloroethylene which comprises providing a movable bed of adsorbent selected from the group consisting of active carbon, wood charcoal, animal charcoal, silica gel and alumina gel which has been impregnated with a metal chloride catalyst, said movable bed comprising from the top to the bottom, a cooling zone for the adsorbent, an adsorption and reaction zone, a pyrolysis zone maintained at a temperature between 350 and 450° C. and a separation zone for separating the formed products from the moving bed, feeding gaseous chlorine at the top of the adsorption and reaction zone, feeding ethylene into the middle of the adsorption and reaction zone, wherein the two gases are interacted in a molecular ratio of substantially 1:1, submitting the 1,2-dichloroethane produced to pyrolysis in the pyrolysis zone, separating the produced organic chlorinated compounds and hydrogen chloride from the movable bed in the separation zone, rectifying the organic chlorinated products to separate monochloroethylene in a pure state from the remainder of said products, recycling the remainder of said products into the pyrolysis zone for cracking the same into monochloroethylene, and recycling the adsorbent into said cooling zone by means of an ascending stream of hydrogen chloride.

5. Process for the preparation by addition chlorination of 3-chloropropene which comprises providing a movable bed of an adsorbent which has been impregnated with a catalyst favorably affecting the rate of reaction between chlorine and propene, said movable bed comprising, from the top to the bottom, a cooling zone for the adsorbent, an adsorption and reaction zone, a pyrolysis zone maintained at a temperature between 400 and 500° C. and a separation zone for separating the formed products from the moving bed, feeding gaseous chlorine at the top of the adsorption and reaction zone, feeding propylene into the middle of the adsorption and reaction zone, wherein the two gases are interacted in a molecular ratio of substantially 1:1, submitting the dichloropropene produced to pyrolysis in the pyrolysis zone, separating the produced organic chlorinated compounds and hydrogen chloride from the movable bed in the separation zone, rectifying the organic chlorinated products to separate 3-chloropropane in a pure state from the remainder of said products, recycling the remainder of said products into the pyrolysis zone for cracking the same into 3-chloropropene, and recycling the adsorbent into said cooling zone by means of an ascending stream of hydrogen chloride.

6. A process for the preparation by addition chlorination of 3-chloropropene which comprises providing a movable bed of adsorbent selected from the group consisting of active carbon, wood charcoal, animal charcoal, silica gel and alumina gel which has been impregnated with a metal chloride catalyst, said movable bed comprising, from the top to the bottom, a cooling zone for the adsorbent, an adsorption and reaction zone, a pyrolysis zone maintained at a temperature between 400 and 500° C. and a separation zone for separating the formed products from the moving bed, feeding gaseous chlorine at the top of the adsorption and reaction zone, feeding propylene into the middle of the adsorption and reaction zone, wherein the two gases are interacted in a molecular ratio of substantially 1:1, submitting the dichloropropene produced to pyrolysis in the pyrolysis zone, separating the produced organic chlorinated compounds and hydrogen chloride from the movable bed in the separation zone, rectifying the organic chlorinated products to separate 3-chloropropane in a pure state from the remainder of said products, recycling the remainder of said products into the pyrolysis zone for cracking the same into 3-chloropropene, and recycling the adsorbent into said cooling zone by means of an ascending stream of hydrogen chloride.

References Cited in the file of this patent
UNITED STATES PATENTS

| | | |
|---|---|---|
| 2,167,927 | Groll et al. | Aug. 1, 1939 |
| 2,321,472 | Engs et al. | June 8, 1943 |
| 2,756,127 | James et al. | July 24, 1956 |
| 2,756,247 | James et al. | July 24, 1956 |
| 2,763,699 | Van Dijk et al. | Sept. 18, 1956 |